(12) United States Patent
Gombert et al.

(10) Patent No.: US 7,215,323 B2
(45) Date of Patent: May 8, 2007

(54) THREE-DIMENSIONAL INTEGRATED TOUGH SCREEN INPUT APPARATUS

(75) Inventors: Bernd Gombert, Seefeld (DE); Bernhard von Prittwitz, Seefeld (DE)

(73) Assignee: 3DConnexion GmbH, Seefeld (DE)

( * ) Notice: Subject to any disclaimer, the term of this patent is extended or adjusted under 35 U.S.C. 154(b) by 317 days.

(21) Appl. No.: 10/433,513

(22) PCT Filed: Sep. 18, 2002

(86) PCT No.: PCT/EP02/10477

§ 371 (c)(1),
(2), (4) Date: Oct. 8, 2003

(87) PCT Pub. No.: WO03/027821

PCT Pub. Date: Apr. 3, 2003

(65) Prior Publication Data

US 2004/0046735 A1 Mar. 11, 2004

(30) Foreign Application Priority Data

Sep. 21, 2001 (DE) .............................. 101 46 471

(51) Int. Cl.
*G09G 5/08* (2006.01)
(52) U.S. Cl. ....................... 345/157; 345/173
(58) Field of Classification Search ................ 345/156, 345/157, 161, 163, 167, 173
See application file for complete search history.

(56) References Cited

U.S. PATENT DOCUMENTS

| | | | | |
|---|---|---|---|---|
| 4,719,455 A | * | 1/1988 | Louis | 345/184 |
| 5,446,480 A | * | 8/1995 | Yoshida | 345/157 |
| 5,559,301 A | * | 9/1996 | Bryan et al. | 84/653 |
| 5,798,748 A | | 8/1998 | Hilton et al. | |
| 5,854,622 A | * | 12/1998 | Brannon | 345/161 |
| 5,905,485 A | * | 5/1999 | Podoloff | 345/157 |
| 5,959,863 A | * | 9/1999 | Hoyt et al. | 700/85 |
| 5,995,104 A | * | 11/1999 | Kataoka et al. | 715/848 |
| 6,001,015 A | * | 12/1999 | Nishiumi et al. | 463/38 |
| 6,229,456 B1 | * | 5/2001 | Engholm et al. | 341/35 |

FOREIGN PATENT DOCUMENTS

| | | |
|---|---|---|
| DE | 36 11 336 C2 | 4/1986 |
| DE | 298 04 023 U1 | 2/1998 |
| EP | 0 653 725 A2 | 11/1994 |
| EP | 0 979 990 A2 | 8/1999 |

* cited by examiner

*Primary Examiner*—Amr A. Awad
*Assistant Examiner*—Tom Sheng
(74) *Attorney, Agent, or Firm*—Scully, Scott, Murphy & Presser, P.C.

(57) ABSTRACT

A 3D input device (102) is used to generate control data (108) for electronic or electrical devices, and has:
- an actuation part (104), which is designed so that it can be manipulated indirectly or directly by at least one finger or hand of the user,
- a base plate (106), with respect to which the actuation part (104) is mounted so that it can be moved, the relative movement between the actuation part (104) and the base plate (106) being evaluated in order to generate the control data, and
- a display device with a touch screen (107), the touch screen (107) being integrated into the upper side of the base plate (106).

Alternatively, the touch screen (107) may be integrated into the upper side of the actuation part (104). The touch screen (107) of the display device is arranged substantially perpendicular to the longitudinal axis (118) of the actuation part (104).

4 Claims, 9 Drawing Sheets

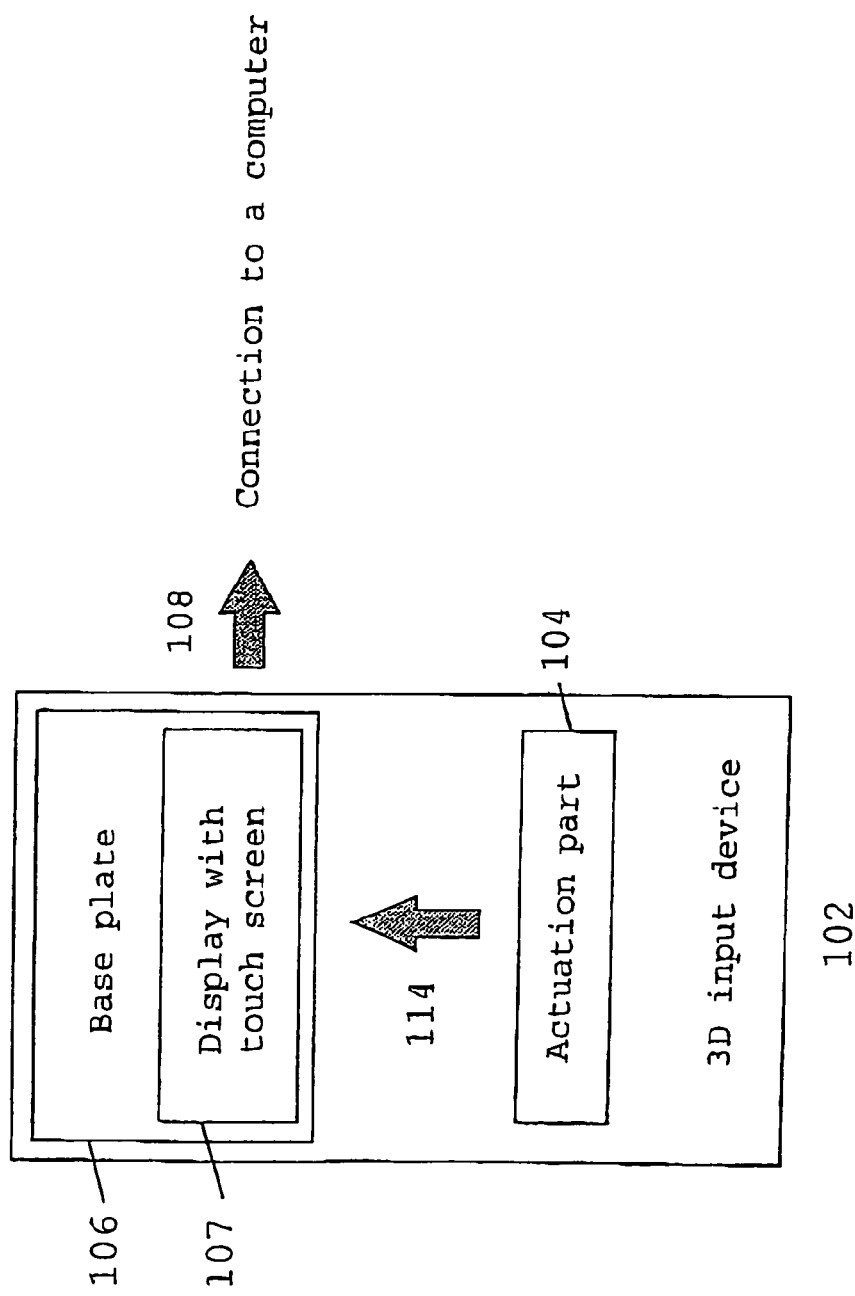

FIG. 5

Adjustment of the response threshold

Translation:    Rotation:

x    φx
y    φy
z    φz

Response times for translations (T) and rotations (R)

T_T    T_R

THREE-DIMENSIONAL INTEGRATED TOUGH SCREEN INPUT APPARATUS

The invention relates to a hand-operated input and control device which can be moved in three dimensions. In particular, the present invention relates to a display device which is integrated into a base plate of the input device and has a touch screen, with the aid of which it is possible, for example, to individually alter the basic settings of the input device, such as allocations of functions which can be initiated and/or the sensitivity of the input device for translation or rotation movements of the input device.

Since the underlying invention can advantageously be used in the field of controlling virtual and/or real objects, the conventional aids for the input of information according to the current prior art, which are used for controlling objects in the field of virtual reality. (VR) applications, will be discussed in brief below. Examples of applications for real objects are robots or electrical and electronic devices in the household, when the 3D input device is used in the manner of a remote control. Further applications are found, for example, in the automotive field (adjustment of electrical seats, wing mirrors).

Conventional input systems such as keyboards, mice, tracker balls and joysticks are nowadays very widespread. They are used in order to control position marks (cursors), mouse pointers etc., for example in order to be able to navigate through a virtual scene or move virtual objects on the screen, or real objects.

With a touch screen, it is possible to point directly at objects which are represented on the screen by using the finger, without needing further auxiliary devices which waste space on the desk. Low-resolution touch screens have from 10 to 50 positions in the horizontal and vertical directions, and use horizontal and vertical rows of infrared light-emitting diodes and photosensors in order to construct a grid of invisible light beams immediately in front of the screen. Both vertical and horizontal light beams are broken when the screen is touched. The current finger position can be determined on the basis of this information.

Another known embodiment of touch-sensitive information-input devices is the capacitively coupled touch panel. This gives a resolution of about 100 positions in each direction. When a user touches the conductively coated glass plate of the touch panel using a finger, the current finger position can be determined on the basis of the change in impedance. Other, high-resolution panels use two transparent layers at a minimal distance from one another. One of them is conductively coated, and the other is coated with a resistive material. Under the effect of finger pressure, these two layers touch and the current finger position can then be determined by measuring the resultant voltage drop. A lower-resolution and less expensive variant of this technology uses a grid of fine wires instead of these layers.

According to the prior art, various solutions for the problem of controlling the movement of virtual objects in real time are now available, each of these solutions being optimised for a special application. Each of these solutions therefore has certain restrictions associated with it. In order to be able to explain some of the most important of these solutions to some extent, it is necessary to discuss their most important features in brief.

One way of controlling the movement of virtual objects in real time has recently arisen through the development of input devices for computers, which permit the simultaneous input of control signals with a plurality of mutually independent degrees of freedom. The opportunities afforded by this far surpass those which exist, for example, when using a mouse, which can only be controlled two-dimensionally (for example on the work surface of a desk). Although it is also known, for example, to provide a mouse with additional switches, these switches nevertheless have the disadvantage that they do not permit the input of analogue data, but instead are restricted to binary data (on/off).

Various input devices which can generate analogue control signals with various mutually independent degrees of freedom are also known from the prior art, each of these analogue signals hence being usable as a parameter value for control of virtual objects. Such manually controllable input systems, which allow navigation in three dimensions, are nowadays used in a range of widely differing technical application fields.

For example, Patent Specification U.S. Pat. No. 5,757,360 discloses an ovoid input device for computers, which can be moved freely in space by one hand of the user, its instantaneous positions, movement directions, speeds and accelerations being determined and these kinematic data being transmitted wirelessly to a computer. An analogue movement action is then identified in the form of a movement pattern, from which movement commands are derived and converted into an animated graphical representation. The movement patterns are automatically identified with the aid of a pattern-recognition algorithm. Control commands are also generated. The disadvantage with this method is that it is not freely specifiable since movement actions of the user, which are recorded in analogue by the input device, are assigned to corresponding movement actions of stored movement sequences of an animated graphical representation, and can only be represented as such.

Input devices which have manually operated force-moment sensors are known, for example, from Patent Specifications DE 36 11 336 C2, DE 37 64 287 and EP 0 979 990 A2.

From the European Patent Specification EP 0 979 990 A2 cited last, it is known to use such a force-moment sensor for controlling actuation elements of a real or virtual mixing or control console, for example in order to create and configure new colour, light and/or sound compositions. In this case, the intuitive spatial, control in three degrees of freedom in translation and three degrees of freedom in rotation can advantageously be applied to continuous spatial mixing or control of a large number of optical and/or acoustic parameters. For control, a pressure is exerted on the actuation surface of the input device, and a pulse is thereby generated which is recorded with the aid of the force-moment sensor and is converted into a vector pair consisting of a force vector and a moment vector. If certain characteristic impulse rules are in this case fulfilled, an object-specific control operation and/or a technical function, for example, may be initiated by switching into an activation state, or ended again, by switching into a deactivation state.

It is furthermore known from this document for the said force-moment sensor to be fitted as an actuation element of a 3D input device, laterally on a touch screen, so that the longitudinal axis of the actuation element is parallel to the display and actuation surface of the touch screen. However, this entails the disadvantage that the direction in which the touch screen is viewed does not coincide with the longitudinal axis of the actuation element. The effect of this is that the hand-eye coordination of the user is compromised, since the directions of control movements of the actuation element and object movements displayed on the screen do not coincide if the axial allocation of the actuation element is unfavourable.

G 298 04 023 discloses a hemispherical input device with buttons for controlling synthesisers or MIDI controllers.

OBJECT OF THE PRESENT INVENTION

On the basis of the prior art cited above, it is an object of the present invention to provide a convenient programmable input device, with the aid of which the user is allowed interactive, intuitive control of the movement of virtual objects in real time, and the coordination of hand and eye is improved at the same time. In particular, the programming of this input device is intended to be simplified without the need for programming via menus of a computer-controlled configuration program.

This object is achieved according to the invention, by the features of the independent claims. Advantageous exemplary embodiments, which develop the concept of the invention, are defined in the dependent claims.

SUMMARY OF THE PRESENT INVENTION

In the scope of the underlying invention, the man-machine interface is represented by a 3D input device. It should be noted that this 3D input device constitutes only an example of an input device for generating control signals. In principle, any other kind of input device is likewise suitable. The 3D input device according to the invention has, however, the great advantage that control signals with different degrees of freedom can be input in a particularly intuitive way.

According to the preferred first exemplary embodiment of the underlying invention, a 3D input device for transmitting control data to electronic or electrical devices is provided. According to the invention, this 3D input device has:

an actuation part, which is designed so that it can be manipulated indirectly or directly by at least one finger or hand of the user, a base plate, with respect to which the actuation part is mounted so that it can be moved, and a display device with a touch screen. The relative movement between the actuation part and the base plate is evaluated in order to generate the control data. The touch screen is in this case integrated into the upper side of the base plate, which constitutes a compact and user-friendly arrangement.

According to a second exemplary embodiment of the underlying invention, a 3D input device transmitting control data to electronic or electrical devices is provided, which has the following components:

an actuation part which is designed so that it can be manipulated indirectly or directly by at least one finger or using a hand of the user, a base plate, with respect to which the actuation part is mounted so that it can be moved, and a display device with a touch screen. The relative movement between the actuation part and the base plate is evaluated in order to generate the control data. The touch screen is integrated into the upper side of the actuation part. This constitutes a particularly compact embodiment.

According to a further aspect of the invention, a 3D input device for transmitting control data to electronic or electrical devices is provided, which has the following components:

an actuation part, which is designed so that it can be manipulated indirectly or directly by at least one finger or using a hand of the user, a base plate, with respect to which the actuation part is mounted so that it can be moved, and a display device with a touch screen, the touch screen being arranged substantially perpendicular to the longitudinal axis of the actuation part. The relative movement between the actuation part and the base plate is evaluated in order to generate the control data. The direction in which the touch screen is viewed hence advantageously coincides with the longitudinal axis of the actuation part, which allows simplified hand-eye coordination.

The device may have a processor, which is functionally coupled to the touch screen and to the actuation part, so that parameters of the 3D input device, for example sensitivity, axial allocation, function-key allocation etc., can be adjusted by means of an input on the touch screen.

According to the invention, the sensitivity, the response thresholds and/or the response times of the 3D input device for movements with up to three degrees of freedom in translation and/or three degrees of freedom in rotation may furthermore optionally be adjusted by manual inputs via the touch screen of the display device.

Assignment of optional technical functions to the degrees of freedom of the 3D input device may furthermore be adjustable by manual inputs via the touch screen of the display device.

The base plate may be used for resting on a working document.

In a special application of the present invention, provision may be made for the device to have an interface for wireless transmission of control data to an electrically operated device. This interface makes it possible for the input device to be used in the manner of a remote control.

BRIEF DESCRIPTION OF THE DRAWINGS

Further properties, features, advantages and expedient aspects of the underlying invention can be found in the subordinate dependent claims and the following description of the preferred exemplary embodiments of the invention, which are depicted in the following drawings, in which:

FIG. 1a shows a simplified block diagram 100a according to the preferred first exemplary embodiment of the underlying invention, in which a display device with a touch screen 107 is integrated into the upper side of the base plate 106, FIG. 5 shows a window 500 of the display device 107 with an integrated touch screen for adjusting the response thresholds of the 3D input device 102 for translation movements of virtual objects in the x, y and z directions, for rotation movements of, virtual objects in the $\phi_x$, $\phi_y$ and $\phi_z$ directions, and for adjusting the response times of the 3D input device 102 for translation and rotation movements.

DETAILED DESCRIPTION OF THE INVENTION

The functions of the modules contained in the preferred exemplary embodiment of the present invention, as depicted in FIGS. 1a to 6, will be described in more detail below. The, structure and the mechanical components of a 3D input device with a touch screen according to two exemplary embodiments of the present invention will be explained first.

The 3D input device according to the invention here comprises the following components:

- an actuation part 104, which can be manipulated indirectly (i.e. without direct access) or directly (direct access) using at least one finger or hand of the user,
- a base plate 106, on which the actuation part 104 is mounted so that it can be moved in three axes, in order to be able to record forces $\vec{F}(t) := F_x(t) \cdot \vec{e}_x + F_y(t) \cdot \vec{e}_y + F_z(t) \cdot \vec{e}_z$ [N] and turning moments $\vec{M}(t) := M_x(t) \cdot \vec{e}_x + M_y(t) \cdot \vec{e}_y + M_z(t) \cdot \vec{e}_z$ [Nm]

with components $F_x(t)$, $F_y(t)$, $F_z(t)$, $M_x(t)$, $M_y(t)$ and $M_z(t)$ in the directions of the unit vectors $\vec{e}_x$, $\vec{e}_y$ and $\vec{e}_z$ of a three-dimensional coordinate system with the axes x, y and z at any point in time t, and

- function keys 106a, which can be freely programmed by the user.

Movement signals of the user with up to three degrees of freedom in translation x, y and z and/or up to three degrees of freedom in rotation $\phi_x$, $\phi_y$, and $\phi_z$ are in this case interpreted as control signals 114 from the actuation part 104 to the base plate 106.

Figure 1B:
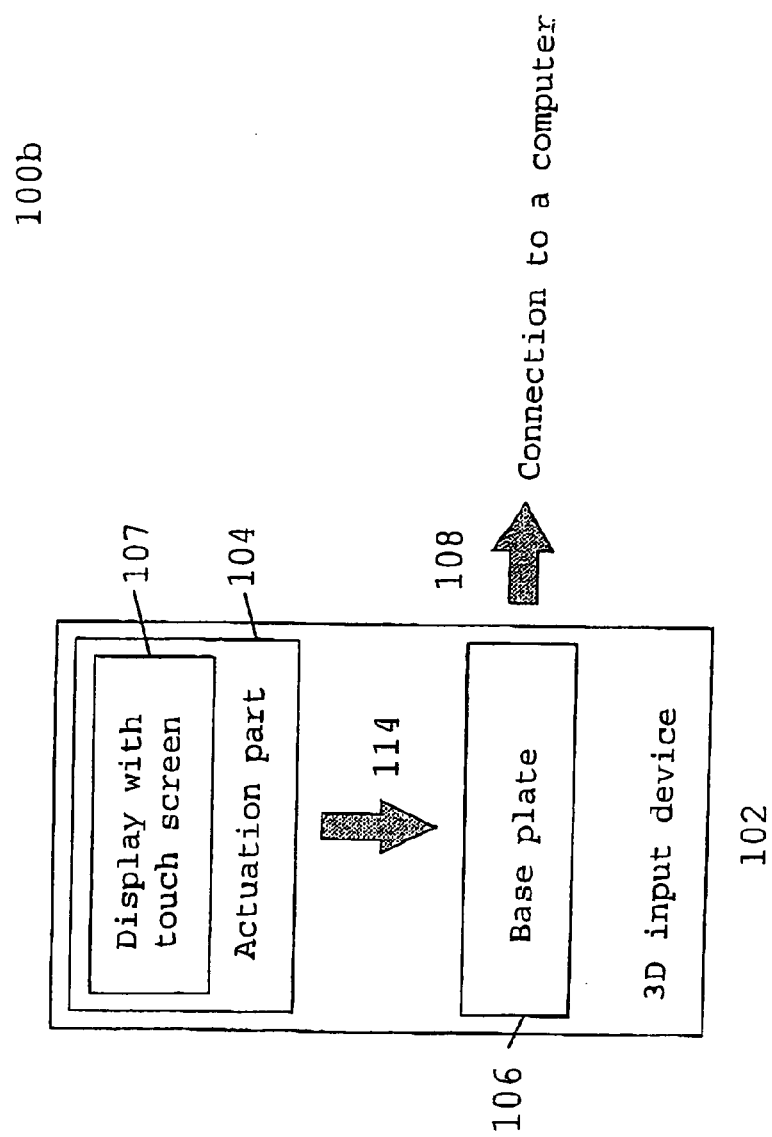
FIG. 1b shows a simplified block diagram 100b according to a second exemplary embodiment of the underlying invention, in which a display device with a touch screen 107 is integrated into the upper side of the actuation part 104 of the 3D input device 102.

FIG. 1a shows a simplified block diagram 100a according to the preferred first exemplary embodiment of the underlying invention, in which a display device with a touch screen 107 is integrated into the upper side of the base plate 106. In contrast to this, FIG. 1b shows a simplified block diagram 100b according to a second exemplary embodiment of the underlying invention, in which a display device with a touch screen 107 is integrated into the upper side of the actuation part 104 of the 3D input device 102. Programming of the function keys 106a can be made possible with the aid of the touch screen.

Referring to the two block diagrams 200a and 200b in FIGS. 2a and 2b, respectively, the components of the 3D input device 102 as well as the signals interchanged between these components, according to the preferred first exemplary embodiment and the second exemplary embodiment of the underlying invention, will be explained in more detail below.

Figure 2A:
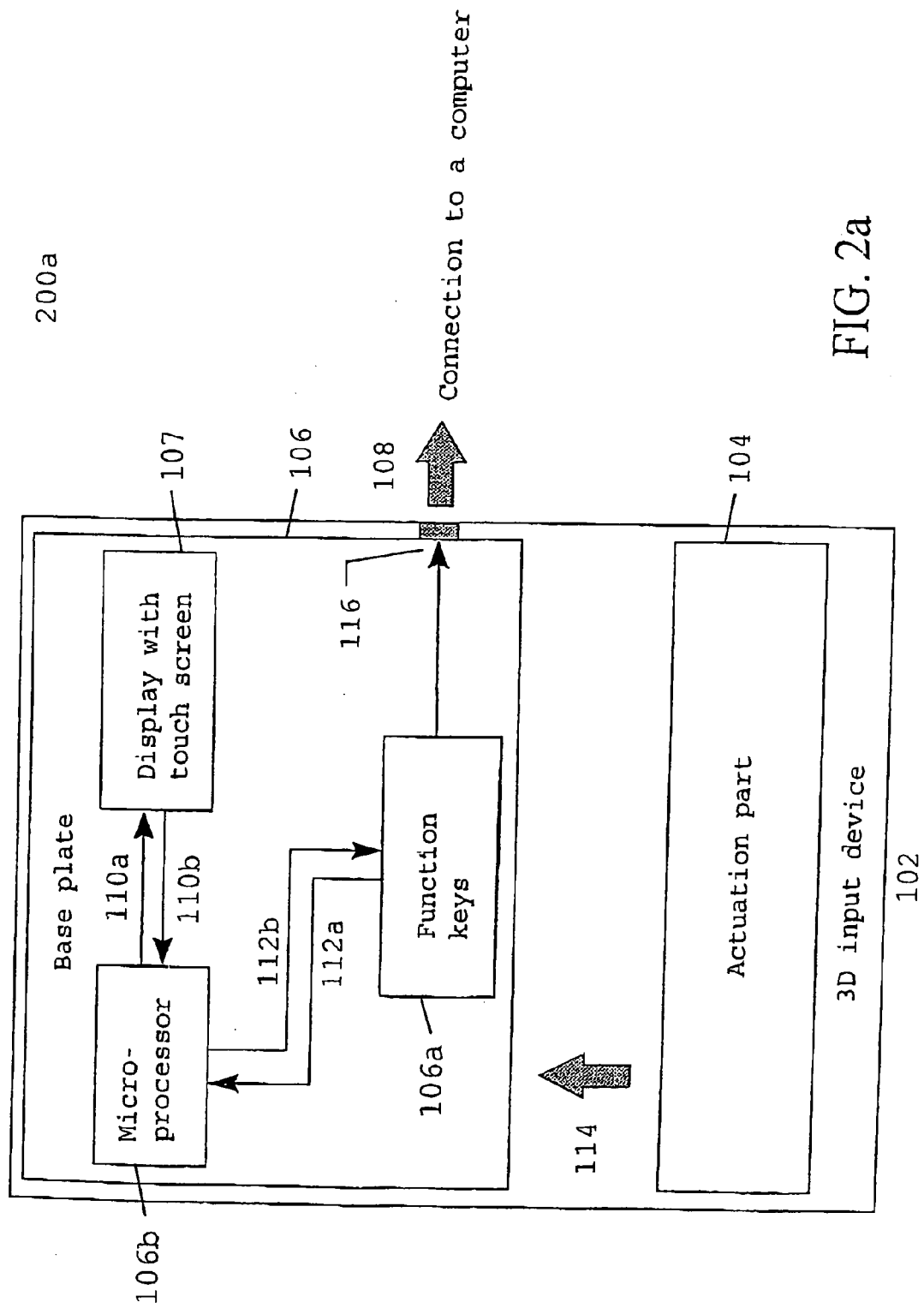
FIG. 2a shows a detailed block diagram 200a for illustrating the components of the 3D input device 102 as well as, the signals 110a+b and 112a+b interchanged between these components according to the preferred first exemplary embodiment of the underlying invention, in which a display device with a touch screen 107 is integrated into the upper side of the base plate 106.

FIG. 2a represents a detailed block diagram 200a for illustrating the components of the 3D input device 102 as well as the signals 110a+b and 112a+b interchanged between these components according to the preferred first exemplary embodiment of the underlying invention, in which a display device with a touch screen 107 is integrated into the upper side of the base plate 106.

Figure 2B:
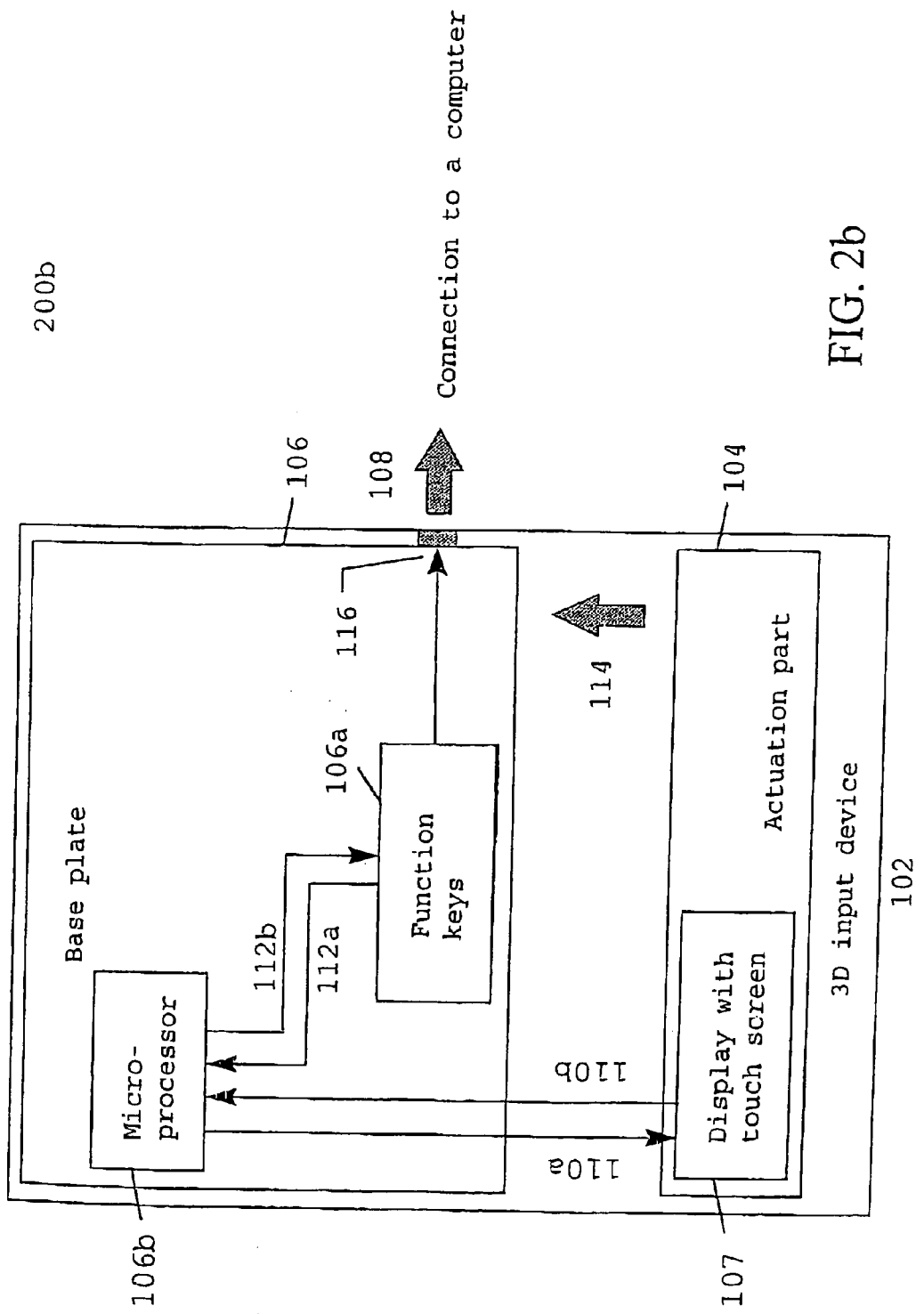
FIG. 2b shows a detailed block diagram 200b for illustrating the components of the 3D input device 102 as well as the signals 110a+b and 112a+b interchanged between these components according to the second exemplary embodiment of the underlying invention, in which a display device with a touch screen 107 is integrated into the upper side of the actuation part 104 of the 3D input device 102.

FIG. 2b shows a detailed block diagram 200b for illustrating the components of the 3D input device 102 as well as the signals 110a+b and 112a+b interchanged between these components according to the second exemplary embodiment of the underlying invention, in which a display device with a touch screen 107 is integrated into the upper side of the actuation part 104 of the 3D input device 102.

In order to allow communication between the actuation part 104 and the base plate 106, the two components are connected to one another via an input/output interface for interchanging control signals 114, which is not indicated in FIGS. 2a and 2b. The 3D input device 102 furthermore has an interface 116 to a computer. Programmings input via the input device with a touch screen 107 are sent as programming signals 110b to a microprocessor 106b, which is integrated in the base plate 106, and travel as control signals 112b to the programming-signal input of the function keys 106a. In the reverse direction, data signals 112a are sent from the data-signal output of the function keys 106a to the microprocessor 106b, if inputs have been carried out by the user. They travel as data signals 110a to the signal input of the display device with a touch screen 107, in order to be displayed or graphically visualised there.

With appropriate control by the user, this 3D input device 102 is capable of generating control signals 108 for six mutually independent degrees of freedom. These comprise three degrees of freedom in translation, which will be referred to below as x, y and z, as well as three degrees of freedom in rotation, which will be referred to below as $\phi_x$, $\phi_y$, and $\phi_x$. Here, the variables x, y and z denote the orthogonal axes of a three-dimensional Cartesian coordinate system. If these variables are combined in vector notation, then the following is obtained at each discrete point in time n (with the units being omitted):

the position vector $\vec{x}(n) := [x(n), y(n), z(n)]^T \in \square^3$ and the rotation direction vector $\vec{\phi}(n) := [\phi_x(n), \phi_y(n), \phi_z(n)]^T \in \square^3$.

Yet other degrees of freedom may be of course added comparatively simply, for example with the aid of key controls or switches. It should be noted in this context that switches or keys as a rule generate binary control signals (on/off), whereas the aforementioned three degrees of freedom in translation x, y and z, and the three degrees of freedom in rotation $\phi_x$, $\phi_y$ and $\phi_z$ can respectively give analogue control signals, which are then available for further processing as digital signals, for example, with byte-wise coding into $2^8=256$ levels.

Since the three degrees of freedom in translation and the three degrees of freedom in rotation, x, y, z, $\phi_x$, $\phi_y$ and $\phi_z$, respectively, can be recorded as "analogue signals" or digital signals quantised into 256 levels, the variation in these control signals 108 as a function of time can also be evaluated according to the present invention by the freely specifiable real-time control 102, subsequently described in more detail below, for animated graphics, video and/or audio sequences. In particular, it is hence possible to record the three-dimensional vectors (with the units being omitted) for the velocity $\vec{v}(n):=[\dot{x}(n),\dot{y}(n),\dot{z}(n)]^T \in \Box^3$, the acceleration $\vec{a}(n):=[\ddot{x}(n),\ddot{y}(n),\ddot{z}(n)]^T \in \Box^3$, the angular velocity $\vec{\omega}(n):=[\dot{\phi}_x(n),\dot{\phi}_y(n),\dot{\phi}_z(n)] \in \Box^3$ and the angular acceleration $\vec{\alpha}(n):=[\ddot{\phi}_x(n),\ddot{\phi}_y(n),\ddot{\phi}_z(n)] \in \Box^3$ of the degrees of freedom x, y, z, $\phi_x$, $\phi_y$ and $\phi_z$ at each discrete point in time n, and optionally process them as further degrees of freedom independently of the absolute value of the respective control signals 108. No further sensors (for example velocity or acceleration sensors) are needed for this on the part of the input device 102.

Figure 3A:
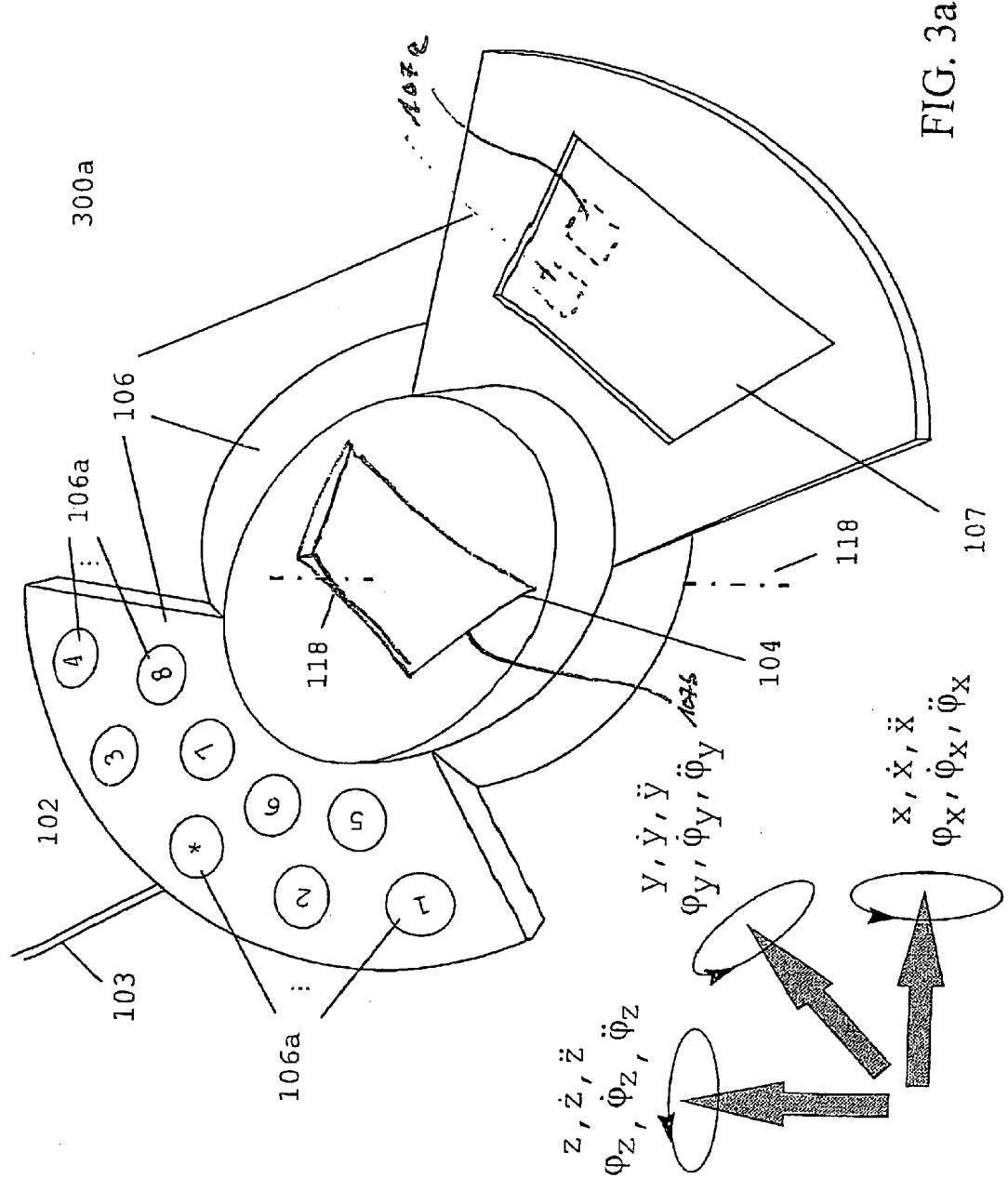
FIG. 3a shows a three-dimensional view 300a of the 3D input device 102 according to the preferred first exemplary embodiment of the underlying invention, in which a display device with a touch screen 107 is integrated into the upper side of the base plate 106 of the 3D input device 102, with a coordinate system in which the six degrees of freedom x,y,z and $\phi_x$, $\phi_y$, $\phi_z$ of the 3D input device and their first and second time derivatives $\dot{x},\dot{y},\dot{z}$ and $\dot{\phi}_x, \dot{\phi}_y, \dot{\phi}_z$ as well as $\ddot{x}, \ddot{y}, \ddot{z}$ and $\ddot{\phi}_x, \ddot{\phi}_y, \ddot{\phi}_z$ are indicated.

FIG. 3a depicts a three-dimensional view 300a of the 3D input device 102 according to the preferred first exemplary embodiment of the underlying invention with a 3D coordinate system, in which the six degrees of freedom, x,y,z, [m] and $\phi_x,\phi_y,\phi_z$ [rad]

of the 3D input device 102, as well as their first and second time derivatives $\dot{x}, \dot{y}, \dot{z}$ [m·s$^{-1}$] and $\dot{\phi}_x, \dot{\phi}_y, \dot{\phi}_z$ [rad·s$^{-1}$] as well as $\ddot{x}, \ddot{y}, \ddot{z}$ [m·s$^{-2}$] and $\ddot{\phi}_x, \ddot{\phi}_y, \ddot{\phi}_z$ [rad·s$^{-2}$]

are indicated. The sketched 3D input device 102 is a modified model of the SpaceMouse® "Classic" from the company LogiCad3D GmbH with a total of nine freely programmable function keys, in which a touch screen 107 is integrated according to the invention into the upper side of the base plate 106.

Figure 3B:
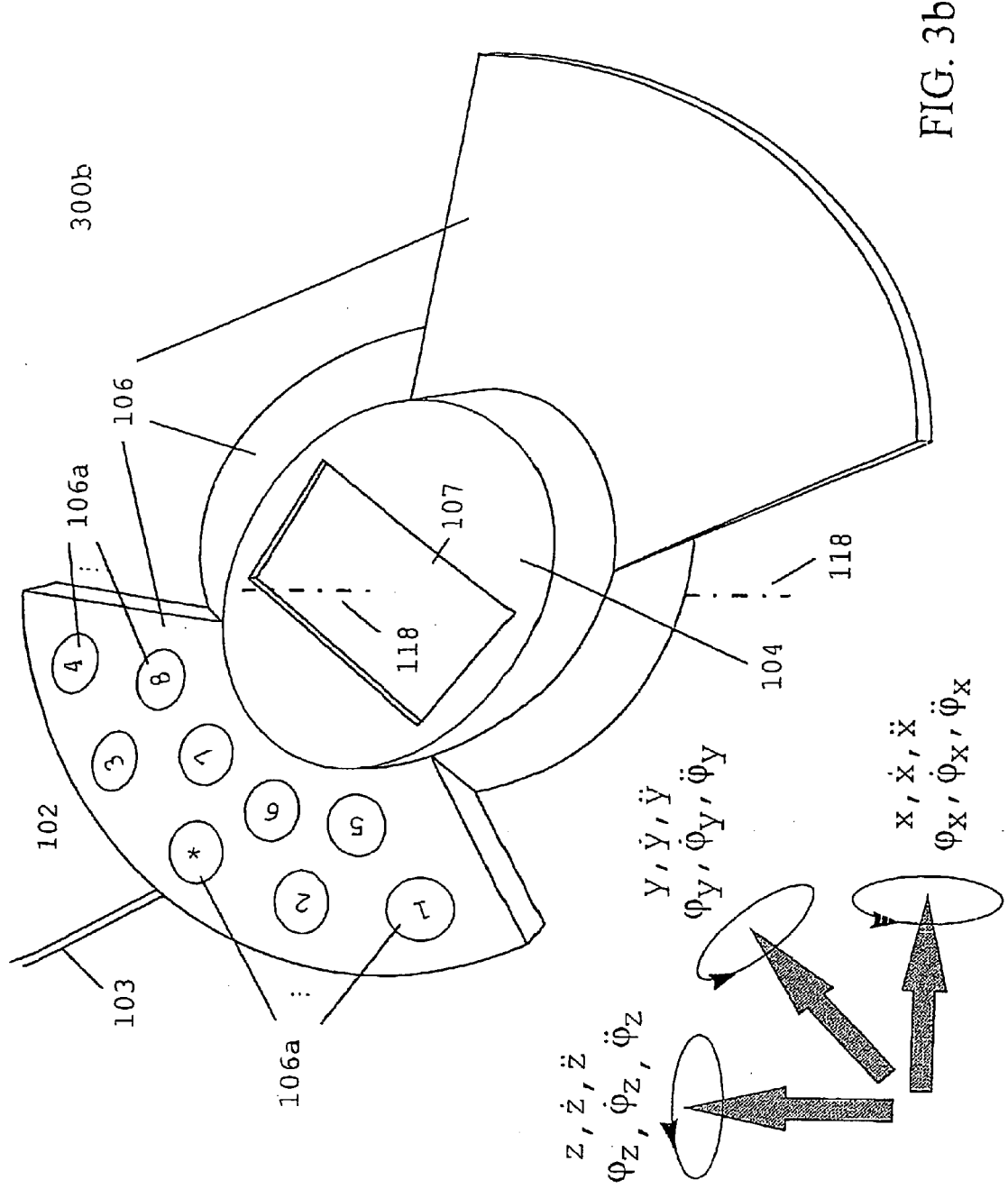
FIG. 3b shows a three-dimensional view 300b of the 3D input device 102 according to the second exemplary embodiment of the underlying invention, in which a display device with a touch screen 107 is integrated into the upper side of the actuation part 104 of the 3D input device 102, with a coordinate system in which the six degrees of freedom x, y, z and $\phi_x$, $\phi_y$, $\phi_z$ of the 3D input device and their first and second time derivatives $\dot{x}, \dot{y}, \dot{z}$ and $\dot{\phi}_x, \dot{\phi}_y, \dot{\phi}_z$ as well as $\ddot{x}, \ddot{y}, \ddot{z}$ and $\ddot{\phi}_x, \ddot{\phi}_y, \ddot{\phi}_z$ are indicated.

Similarly, FIG. 3b shows a three-dimensional view 300b of the 3D input device 102 according to the second exemplary embodiment of the underlying invention with a 3D coordinate system, in which the said six degrees of freedom of the 3D input device 102 as well as their first and second time derivatives are indicated. The sketched 3D input device 102 is again a modified model of the SpaceMouse® "Classic" from the company LogiCad3D GmbH with a total of nine freely programmable function keys, in which a touch screen 107 is integrated according to the invention into the upper side of the actuation part 104.

By manual inputs via the touch screen of the display device 107, according to the invention it is possible to individually adjust the sensitivity of the 3D input device for movements with up to three degrees of freedom in translation and/or three degrees freedom in rotation respectively in 600 levels. In a similar way, with the aid of the touch screen of the display device 107, according to the invention it is also possible to individually adjust the response thresholds as well as the response times of the 3D input device 102 for movements of virtual objects in translation and/or in rotation.

Figure 4:
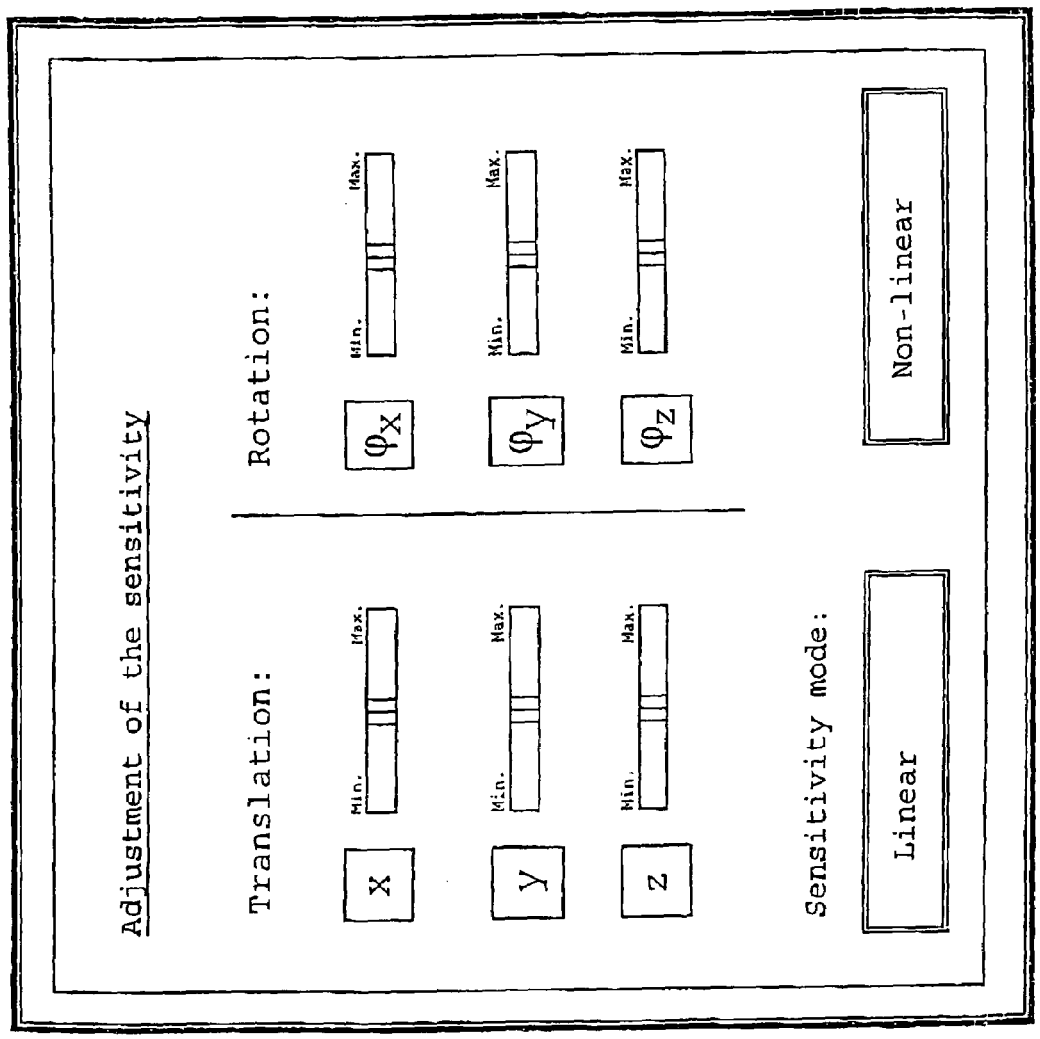
FIG. 4 shows a window 400 of the display device 107 with an integrated touch screen for adjusting the sensitivity levels of the 3D input device 102 for translation movements of virtual objects in the x, y and z directions and for rotation movements of virtual objects in the $\phi_x$, $\phi_y$, and $\phi_z$ directions, wherein distinction can be made between linear and non-linear sensitivity modes.

FIG. 4 shows a window 400 of the display device 107 with an integrated touch screen for adjusting the sensitivity of the 3D input device 102 for translation movements of virtual objects in the x, y and z directions and for rotation movements of virtual objects in the $\phi_x$, $\phi_y$ and $\phi_z$ directions. The sensitivity can in this case be altered, and adapted individually to the mode of operation of the user, by operating the corresponding softkeys and sliders. With the aid of two additional softkeys, it is possible to distinguish between linear and non-linear response modes. In all, 600 sensitivity levels are available for adjustment of the sensitivity.

FIG. 5 sketches a window 500 of the display device 107 with an integrated touch screen for adjusting the response thresholds of the 3D input device 102 for translation movements of virtual objects in the x, y and z directions and rotation movements of virtual objects in the $\phi_x$, $\phi_y$ and $\phi_z$ directions. The response thresholds can in this case be altered, and adapted individually to the mode of operation of the user, by operating the corresponding softkeys and sliders. Two further softkeys are also provided in this window, with the aid of which an adjustment of the response times of the 3D input device 102 for translation or rotation movements of virtual objects can be carried out individually.

Figure 6:
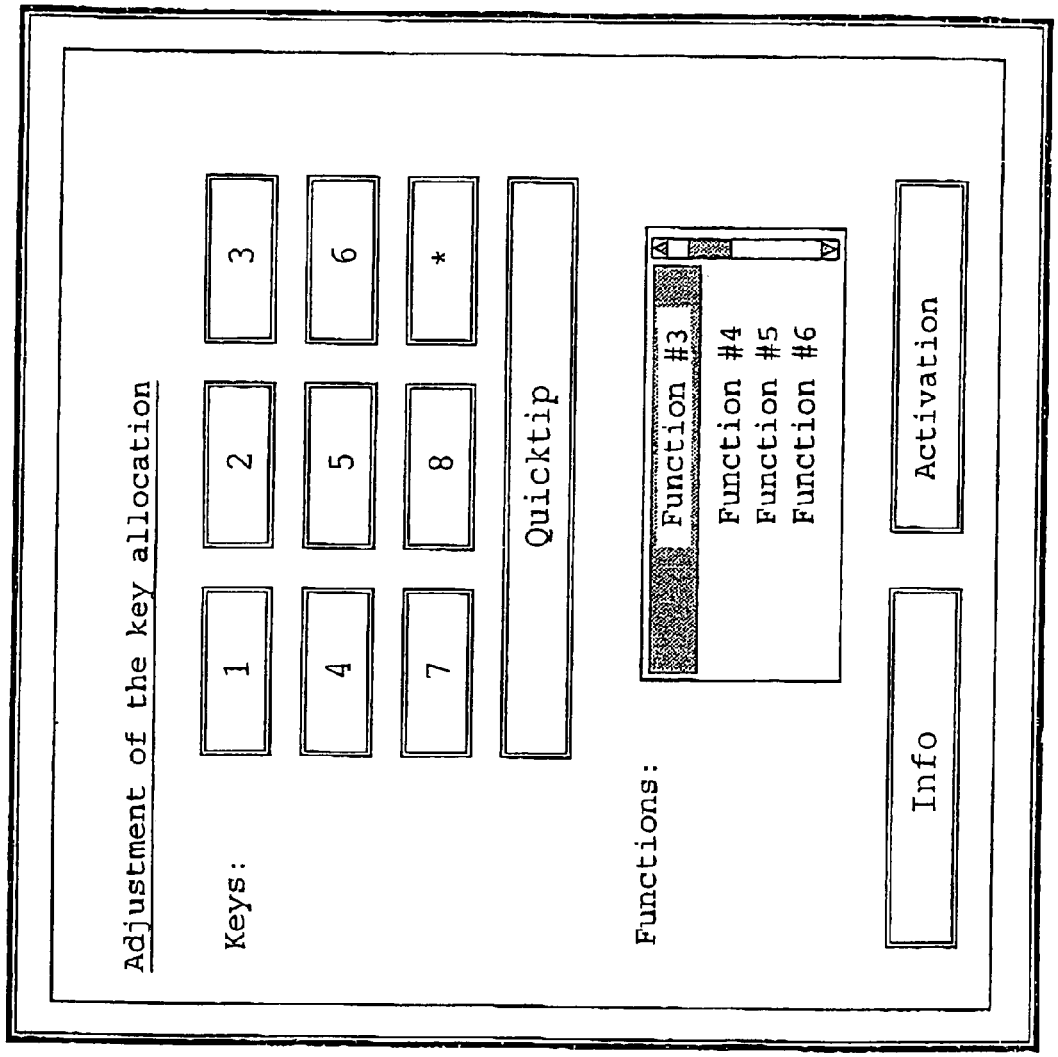
FIG. 6 shows a window 600 of the display device 107 with an integrated touch screen for adjusting the key allocation for the nine keys of the 3D input device 102 and the Quicktip® softkey with functions from a selection window by pressing an information key and an activation key.

FIG. 6 depicts a window 600 of the display device 107 with an integrated touch screen for adjusting the key allocation for the nine keys of the 3D input device 102 and the Quicktip® softkey. The assignment of technical functions to particular function keys 106a of the 3D input device 102 may in this case be carried out, for example, by pressing the softkeys referring to the numbers of the function keys 106a of the 3D input device 102 and selecting functions from a scrolling menu. An assignment in this case counts as having been programmed when the activation key has been pressed. With the aid of the information key, the user can obtain more detailed information about the properties of selected functions, and this can be displayed on request in a further window of the display device 107.

The meaning of the symbols provided with references in FIG. 1a to 6 can be found in the appended list of references.

LIST OF REFERENCES

| No | Symbol |
|---|---|
| 100a | simplified block diagram for illustrating the data signals 110a and programming signals 110b interchanged between the 3D input device 102 and the base plate 106 according to the preferred first exemplary embodiment of the underlying invention, in which a display device with a touch screen 107 is integrated into the upper side of the base plate 106 |
| 100b | simplified block diagram for illustrating the data signals 110a and programming signals 110b interchanged within the 3D input device 102 between the actuation part 104 and the display device 107 according to a second exemplary embodiment of the underlying invention, in which a display device with a touch screen 107 is integrated into the upper side of the actuation part 104 of the 3D input device 102 |
| 102 | 3D input device for input of the control signals 108 |
| 103 | cable connection to a computer |
| 104 | actuation part of the 3D input device 102 |
| 106 | base plate of the 3D input device 102 |

-continued

| No | Symbol |
|---|---|
| 106a | function keys of the base plate 106 |
| 106b | microprocessor (μP), integrated into the base plate 106 of the 3D input device 102 |
| 107 | display device with a touch screen, integrated into the base plate 106 or the actuation part 104 of the 3D input device 102 |
| 108 | control signals from the base plate 106 of the 3D input device 102 to a connected computer |
| 110a | data signals from the signal output of the microprocessor 106b to the signal input of the display device with a touch screen 107 for controlling the display |
| 110b | programming signals from the signal output of the display device with a touch screen 107 to the signal input of the microprocessor 106b for programming of the function keys 106a by the user |
| 112a | data signals from the data-signal output of the function keys 106a to the signal input of the microprocessor 106b for control of functions by the user |
| 112b | control signals from the signal output of the microprocessor 106b to the programming-signal input of the function keys 106a for programming of the function keys 106a |
| 114 | movement signals of the user with up to three degrees of freedom in translation x, y, z [m] and/or up to three degrees of freedom in rotation $\phi_x, \phi_y, \phi_z$ [rad], interpreted as control signals from the actuation part 104 to the base plate 106 |
| 116 | signal output of the 3D input device 102 for control signals 108 from the 3D input device 102 to a computer |
| 118 | (imaginary) vertical longitudinal axis of the actuation part 104 |
| 200a | detailed block diagram for illustrating the components as well as the input and output signals of the 3D input device 102 and the base plate 106 according to the preferred first exemplary embodiment of the underlying invention, in which a display device with a touch screen 107 is integrated into the upper side of the base plate 106 |
| 200b | detailed block diagram for illustrating the components as well as the input and output signals of the 3D input device 102 and the base plate 106 according to the second exemplary embodiment of the underlying invention, in which a display device with a touch screen 107 is integrated into the upper side of the actuation part 104 of the 3D input device 102 |
| 300a | three-dimensional view of the 3D input device 102 and the base plate 106 with a 3D coordinate system, in which the six degrees of freedom x, y, z [m] and $\phi_x, \phi_y, \phi_z$ [rad] of the 3D input device 102, as well as their first and second time derivatives $\dot{x}, \dot{y}, \dot{z}$ [m·s$^{-1}$] and $\dot{\phi}_x, \dot{\phi}_y, \dot{\phi}_z$ [rad·s$^{-1}$] as well as $\ddot{x}, \ddot{y}, \ddot{z}$ [m·s$^{-2}$] and $\ddot{\phi}_x, \ddot{\phi}_y, \ddot{\phi}_z$ [rad·s$^{-2}$], are indicated |
| 300b | three-dimensional view of the 3D input device 102 according to the second exemplary embodiment of the underlying invention, in which a display device with a touch screen 107 is integrated into the upper side of the actuation part 104 of the 3D input device 102 |
| 400 | window of the display device 107 with an integrated touch screen for adjusting the sensitivity levels of the 3D input device 102 for translation movements of virtual objects in the x, y and z directions and for rotation movements of virtual objects in the $\phi_x, \phi_y,$ and $\phi_z$ directions, it being possible to distinguish between linear and non-linear response modes |
| 500 | window of the display device 107 with an integrated touch screen for adjusting the respons.e thresholds of the 3D input device 102 for translation movements of virtual objects in the x, y and z directions, for rotation movements of virtual objects in the $\phi_x, \phi_y,$ and $\phi_z$ directions, as well as for adjusting the response times of the 3D input device 102 for translation and rotation movements |
| 600 | window of the display device 107 with an integrated touch screen for adjusting the key allocation for the nine keys of the 3D input device 102 and the Quicktip ® softkey with functions from a selection window by pressing an information key and an activation key |

The invention claimed is:

1. A 3D input device for generating control data for electronic or electrical devices, having:
    an actuation part, which is designed so that it can be manipulated indirectly or directly by at least one finger or hand of the user, and is capable of both translational and rotational displacement,
    a base plate, with respect to which the actuation part is mounted so that it can be moved, the relative movement between the actuation part and the base plate being evaluated in order to generate the control data,
    a display device with a touch screen, wherein the touch screen is integrated into the upper side of the base plate, and
    a processor, which is functionally coupled to the touch screen of the display device and to the actuation part, so that parameters of the 3D input device can be adjusted by means of an input on the touch screen of the display device.

2. The device as claimed in claim 1, wherein sensitivity of the 3D input device for movements with up to three degrees of freedom in translation and/or three degrees of freedom in rotation can be adjusted by manual inputs via the touch screen of the display device.

3. The device as claimed in claim 1, wherein response thresholds of the 3D input device for movements of virtual objects in translation and/or in rotation can be adjusted by manual inputs via the touch screen of the display device.

4. The device as claimed in claim 1, wherein response times of the 3D input device for movements of virtual objects in translation and/or in rotation can be adjusted individually by manual inputs via the touch screen of the display device.

* * * * *